US006628836B1

(12) United States Patent
Wittenbrink et al.

(10) Patent No.: US 6,628,836 B1
(45) Date of Patent: Sep. 30, 2003

(54) SORT MIDDLE, SCREEN SPACE, GRAPHICS GEOMETRY COMPRESSION THROUGH REDUNDANCY ELIMINATION

(75) Inventors: Craig M. Wittenbrink, Redwood City, CA (US); Erik Ordentlich, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/412,898

(22) Filed: Oct. 5, 1999

(51) Int. Cl.[7] ................................................. G06K 9/36

(52) U.S. Cl. ....................... 382/232; 345/501; 345/506; 345/435

(58) Field of Search .......................... 382/232; 345/506, 345/435, 582, 564, 501

(56) References Cited

U.S. PATENT DOCUMENTS

| | | | | |
|---|---|---|---|---|
| 4,967,375 A | * | 10/1990 | Pelham et al. | 345/564 |
| 5,408,605 A | * | 4/1995 | Deering | 345/501 |
| 5,793,371 A | | 8/1998 | Deering | 345/418 |
| 6,043,824 A | * | 3/2000 | Bier | 345/435 |
| 6,229,553 B1 | * | 5/2001 | Duluk, Jr. et al. | 345/506 |
| 6,268,875 B1 | * | 7/2001 | Duluk, Jr. et al. | 345/506 |

FOREIGN PATENT DOCUMENTS

| | | | | |
|---|---|---|---|---|
| EP | 0364243 | * | 4/1990 | G06F/15/72 |

OTHER PUBLICATIONS

M.M. Chow, "Optimized Geometry Compression for Real–Time Rendering," IEEE Visualization, pp. 347–354 (1997).
M. Deering, "Geometry Compression," Proceedings of SIGGRAPH '95, pp. 13–20 (1995).
J. Li et al., "Progressive Coding of 3–D Graphic Models," Proceedings of IEEE, vol. 86, No. 6, pp. 1052–1063 (1998).
G. Taubin et al., "Geometric Compression Through Topological Surgery," Technical Report RC–20340 (89924), IBM T.J. Watson Resarch Center (1996).
G. Taubin et al., "Geometry Coding and VRML," Proceedings of the IEEE, vol. 86, No. 6, pp. 1228–1243 (1998).
C. Touma et al., "Triangle Mesh Compression," Proceedings of Graphics Interface '98, pp. 26–34 (1998).

* cited by examiner

Primary Examiner—Anh Hong Do

(57) ABSTRACT

A geometry compression method for sort middle, screen space, graphics of the standard graphics pipeline. The pipeline processes a 3D database having geometric objects such as triangles and textures into a display image which may be shown to the user on a display monitor. Lossless compression is achieved through redundancy elimination. Triangles are processed following their transformation to screen space, so that the vertex world 3D locations are determined in their projection to the screen 2D locations. Triangles may also be processed by back projecting the screen space scanlines to test locations against the world space triangles. The general technique is to identify the portions of the data that have little or no effect on the rendered output and remove them during compression. Specific examples disclosed include full packing, constant color, delta coding, edge sharing, slope coding, and color quantization.

15 Claims, 5 Drawing Sheets

SORT MIDDLE, SCREEN SPACE, GRAPHICS GEOMETRY COMPRESSION THROUGH REDUNDANCY ELIMINATION

BACKGROUND OF THE INVENTION

1. Field of Invention

The present invention relates generally to the field of computer graphics and pertains more particularly to sort middle, screen space, graphics geometry compression through redundancy elimination.

2. Discussion of the Prior Art

Modern computer systems have become increasingly graphics intensive. Dedicated special purpose memories and hardware have been developed to meet this need. The majority of graphics systems are built to accelerate the standard graphics pipeline. As an example FIG. 1 shows a block diagram of a graphics pipeline 10 having geometry processing 12 and rasterization 14. The pipeline 10 processes a three dimensional (3D) database 16 having geometric objects 18 and textures 20 into a display image 22 which may be shown to the user on a display monitor (not shown). The geometric objects 18 are typically polygons but may also be triangles, lines, and points. These are also known as primitives. For a particular primitive, its vertices or geometrical point locations ($p_x$, $p_y$, $p_z$) are typically IEEE floating point values. Also, attributes such as colors, normals, and texture coordinates may be specified at each point or for an entire primitive. In binary, the floating point value is made up of one bit for the sign (S), eight bits for the exponent (E or exp), and twenty-three bits for the significand for a total of thirty-two bits. In the case of a triangle, there are three vertices generally having horizontal (x), vertical (y), and depth (z) coordinates in the form of ($v_{0x}$, $v_{0y}$, $v_{0z}$), ($v_{1x}$, $v_{1y}$, $v_{1z}$), and ($v_{2x}$, $v_{2y}$, $v_{2z}$). These primitive vertex data of the geometric objects are sent for geometry processing 12.

During geometry processing 12, this primitive vertex data undergoes modeling transforms, viewing transforms, and viewpoint transforms. The resulting screen space primitives are specified by a number of setup variables. Now one has ($v_{0x}$, $v_{0y}$, $v_{0z}$) in screen space. Setup variables include the starting values and slope of all of the parameters of the primitive. The number, precision, and type of setup variables will vary from application to application. Geometry processing output may include the screen space locations (x and y) of the triangle vertices, the shaded color values (red, green, blue, alpha), the depths (z), the slope of the edges, colors, opacities, and depths across scanlines, triangles, or both. Calculation of the setup variables may be done at the geometry processing stage or at the rasterization stage. This geometry information varies by the rasterization process used and the techniques disclosed below can work with many varieties of rasterization.

Turning now to FIG. 2, a diagram of scan conversion of two triangle types is shown. FIG. 2 is for illustration purposes only as there exist many equivalent methods to rasterize triangles. For both triangle types, edge 1, the longest side, is the primary vertical edge on which scan conversion starts. All scan conversion proceeds in horizontal lines across the triangle as shown. Textures 20 from FIG. 1 may be used as an auxiliary method for looking up a color of a pixel during the scan conversion process. The texture is literally painted onto the polygon by performing an inverse transform lookup from the pixel coordinate, to the polygon coordinate, into the texture space. Finally, the resulting rasterized data is displayed as the display image 22.

In general, the efficient utilization of the special purpose memories and hardware of the graphics system has not been fully considered. As graphics technologies and products become more prevalent in consumer areas, slim profit margins are demanding the utmost efficiencies. Images rendered from a large number of triangles can create a fundamental bottleneck in the system. Approaches to relieve this situation are to either modify the geometry to create fewer triangles or to compress the triangles that are given. While compression has been used to make many technologies possible, such as communications and video technologies, compression has not been used in conventional graphics systems. Compression is necessary to achieve efficiency in database representation to conserve disk storage, system memory, cache memory, and special purpose memories. Additional savings can be achieved by conserving system bus bandwidths, which becomes more critical with unified computer architectures where graphics and system memory are one and the same.

A definite need exists for a system having an ability to meet the efficiency requirements of graphics intensive computer systems. In particular, a need exists for a system which is capable of compressing geometric data in a skillful manner. Ideally, such a system would have a lower cost and a higher productivity than conventional systems. With a system of this type, system performance can be enhanced. A primary purpose of the present invention is to solve this need and provide further, related advantages.

SUMMARY OF THE INVENTION

A geometry compression method is disclosed for sort middle, screen space, graphics of the standard graphics pipeline. The pipeline processes a 3D database having geometric objects such as triangles and textures into a display image which may be shown to the user on a display monitor. Lossless compression is achieved through redundancy elimination. Triangles are processed following their transformation to screen space, so that the vertex world 3D locations are determined in their projection to the screen 2D locations. Triangles may also be processed by back projecting the screen space scanlines to test locations against the world space triangles. The general technique is to identify the portions of the data that have little or no effect on the rendered output and remove them during compression. Specific examples disclosed include full packing, constant color, delta coding, edge sharing, slope coding, and color quantization.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

Figure 1:
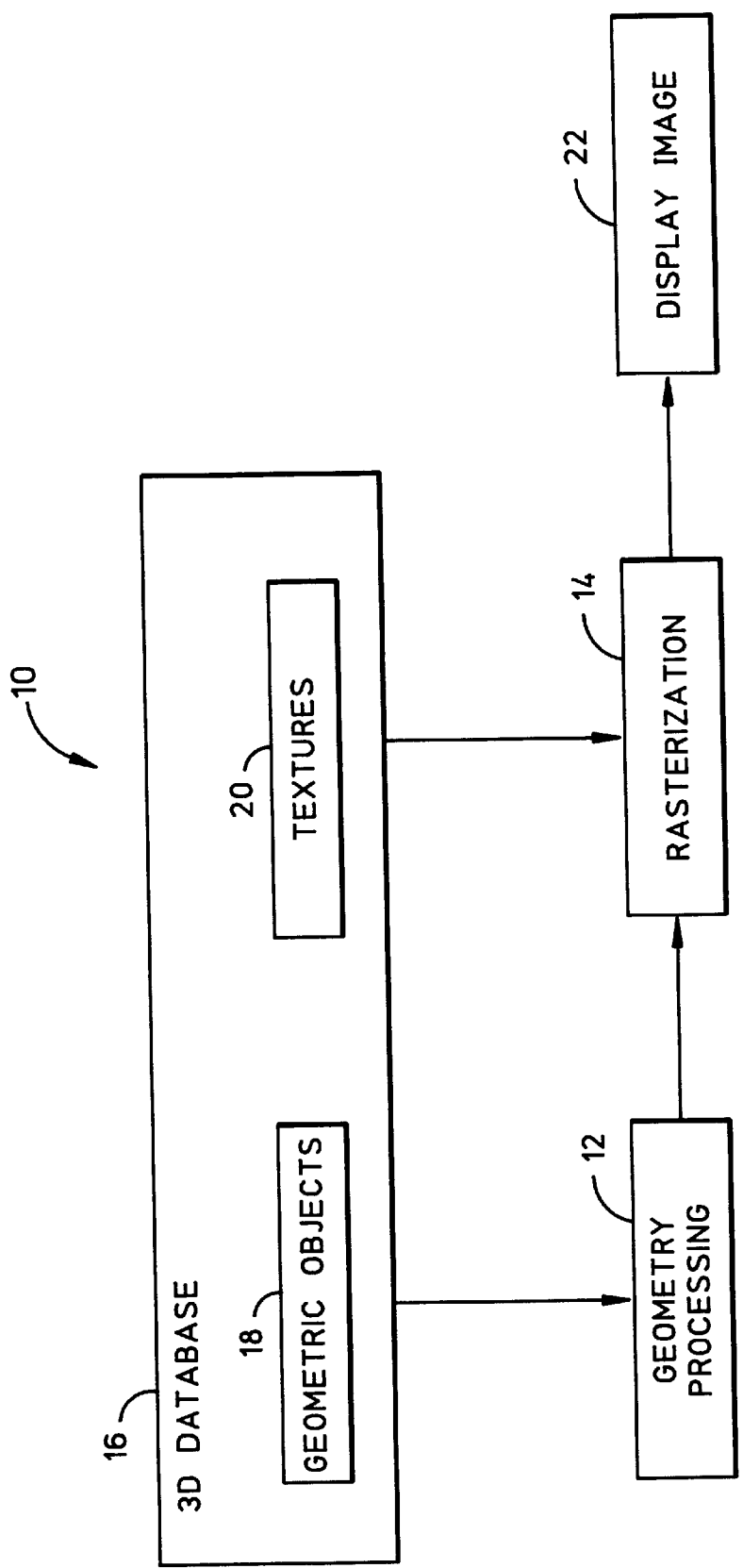
FIG. 1 is a block diagram of a prior art graphics pipeline having geometry processing and rasterization.
Figure 2:
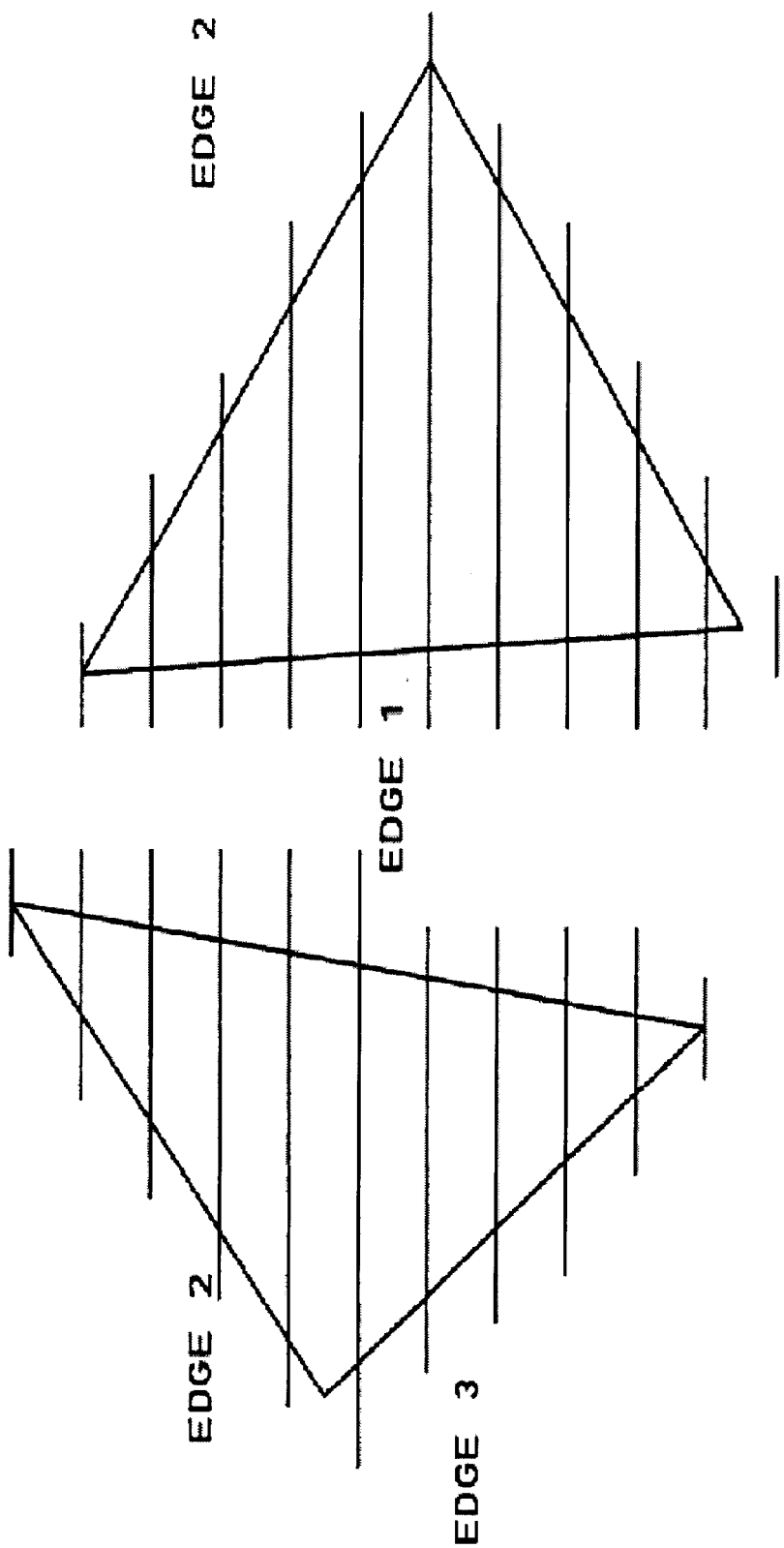
FIG. 2 is a diagram of a known scan conversion of two triangle types.
Figure 3:
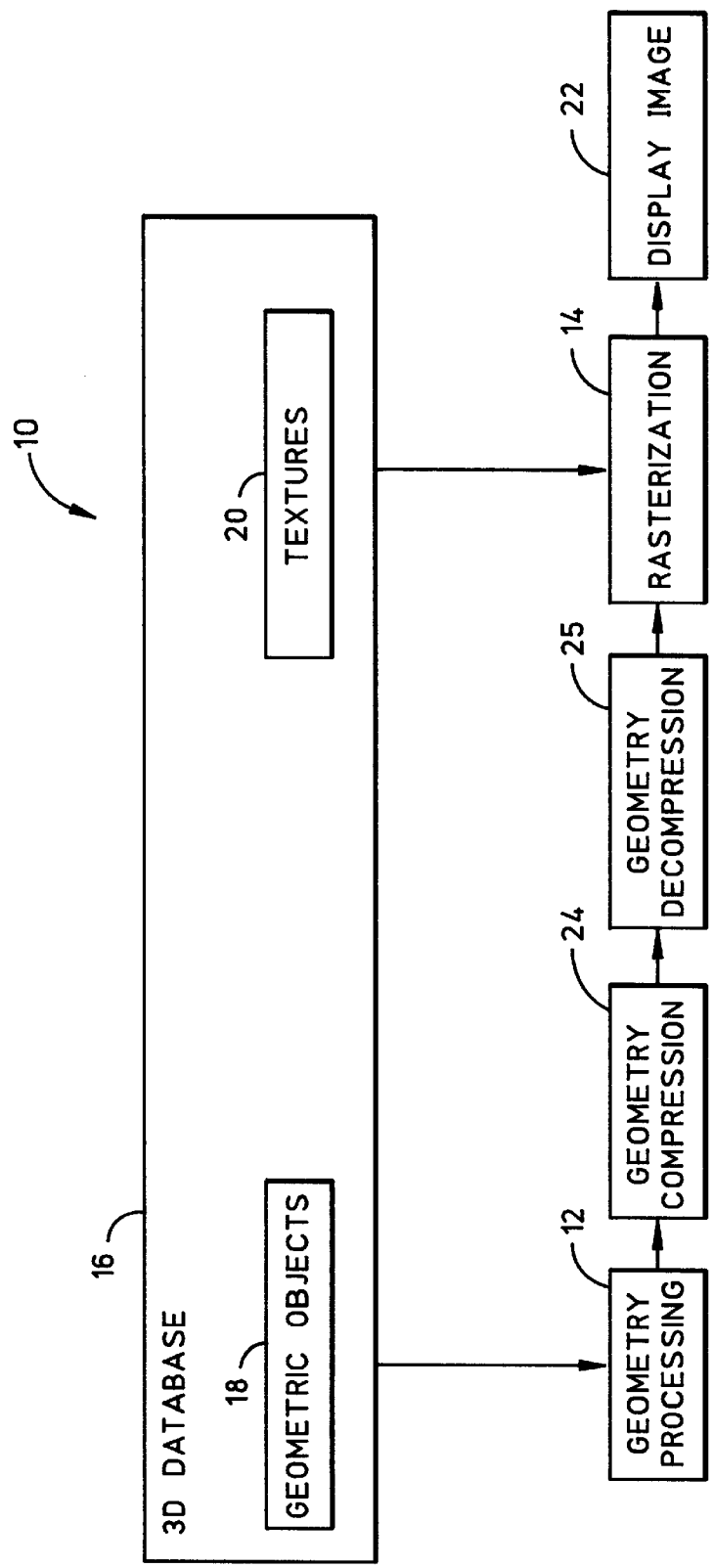
FIG. 3 is a block diagram of the graphics pipeline of the type shown in FIG. 1 having geometry compression and geometry decompression according to one embodiment of the present invention.

Turning now to FIG. 3, a block diagram of the graphics pipeline 10 according to FIG. 1 having geometry compression 24 and geometry decompression 25 according to one embodiment of the present invention is shown. The geometry compression 24 is shown situated between the geometry processing 12 and the rasterization 14 and operates on the setup variables for the screen space primitives of the sort middle traffic as described above. The geometry decompression 25 follows the geometry compression 24 and precedes the rasterization 14. Alternatively, the geometry compression 24 and geometry decompression 25 may be partially or wholly integrated into the geometry processing 12, the rasterization 14, or both. Among the advantages of locating the geometry compression 24 and geometry decompression 25 at this point in the graphics pipeline 10 is that no changes to the application program interface (API) are required thus making the present invention independent of which API is used. Further, more precise knowledge can be utilized from the screen space than the world space. Further still, this location corresponds to a potential bottleneck point as here is an expansion of data from this point forward in the graphics pipeline 10. The geometry compression 24 may perform either or both of the two types of compression which are lossless and lossy. Lossless compression refers to compression with no effect on the rendered output. Unused and redundant data are prime candidates for lossless compression by selective elimination of this data. Lossy compression refers to compression with some effect on the rendered output. Generally the effect will be to such a small extent as to be acceptable on balance. What one deems to be acceptable will depend on the situation.

In this application, lossless compression refers to encoding of the setup variables in such a way that guarantees that the rendered output generated from the encoded data is bit-wise identical to that generated from the original. Thus portions of the data that are unused or redundant and therefore have no effect on the rendered output can be removed by the geometry compression 24.

Recall from above that the vertices of a primitive are typically floating point values made up of thirty-two bits. Under a typical graphics pipeline protocol, there are n bits, indexed from zero to n−1, in a word containing the values. The setup variables may be represented as floating point or fixed point with varying precision as determined by need. For example, z may be represented as forty bits, while color components may be represented as twenty-four bits. In the present embodiment of the invention, setup variables are considered to be fixed point values with differing precision requirements. Assume for example that an elementary protocol for communicating setup data is to transmit the relevant parameters/variables as a sequence of words along with a few bits of overhead per word to identify the type of parameter being conveyed. Part of this overhead is known as the type field and is used to specify the type of setup variable. Recall also from above that the type of setup variables will vary from application to application. The type field permits maximum flexibility in ordering the transmission of parameters as well as in selecting the subset of parameters necessary for describing a primitive. However, this flexibility may not be necessary in many applications. For example, this flexibility is not necessary when the system only has a small number of primitives and a small number of rendering modes.

A geometry compression method that will be referred to as full packing can be utilized by a system when the type field is not necessary. The method includes defining a packet type corresponding to a setup variable type, identifying the type of a set of setup variables, and bundling the setup variables into a packet of the corresponding packet type. Each packet includes a header and a set of setup variables in a predefined order. In this way, the type field for each individual setup variable is eliminated. The actual savings will depend on the situation, but the number of additional bits of the header is substantially less than the number of bits eliminated for all of the type fields for a set of setup variables. Under full packing, over 100 bits would be eliminated in exchange for the header bits. For an image containing hundreds or thousands of primitives, the total savings would be substantial.

Among the setup variables generated by geometry processing is a group of six slope values that specify two slope values for each of the primary colors red (R), green (G), and blue (B). The slope values are added to the starting value to compute the color of each pixel falling inside the triangle. The slopes roughly specify the change in each color per horizontal and vertical pixel distance. However, these slope values may not be necessary in some applications. For example, these slope values are not necessary when the triangle exhibits flat shading as indicated by zero values for all six slope values.

A geometry compression method that will be referred to as constant color can be utilized by a system when these slope values are not necessary. The method includes identifying when all six of the slope values have a zero value and utilizing a bit to indicate that such a condition exists. In this way, the six slope values can be eliminated for the triangle in question. Under constant color, hundreds of bits will be eliminated in exchange for one bit. For an image containing hundreds or thousands of constant color primitives, the total savings would be substantial.

Also among the setup variables generated by geometry processing is a group of six values that specify the starting x, the starting y, and the stopping y coordinates of the three edges of the triangle. However, the information conveyed by these coordinate values may be expressed in a different manner in some applications. For example, when the triangles are predominantly small in size, the coordinate values could be expressed in terms of an anchor coordinate value and two differences relative to the anchor coordinate value.

A geometry compression method that will be referred to as delta coding can be utilized by a system when the triangles are predominantly small in size. The method includes selecting an anchor coordinate value in each of the x and y directions, calculating the differences between the anchor coordinate and the other two coordinates in each of the x and y directions, and encoding the differences. After computing the four differences, these differences are encoded using an adaptive Golomb coding technique which is well known in the art. Other encoding techniques are also possible. In this way, the six coordinate values can be compressed for the triangle in question. Under delta coding, over 100 bits will be eliminated in exchange for four compressed differences. For an image containing hundreds or thousands of primitives, the total savings would be substantial.

Figure 4:
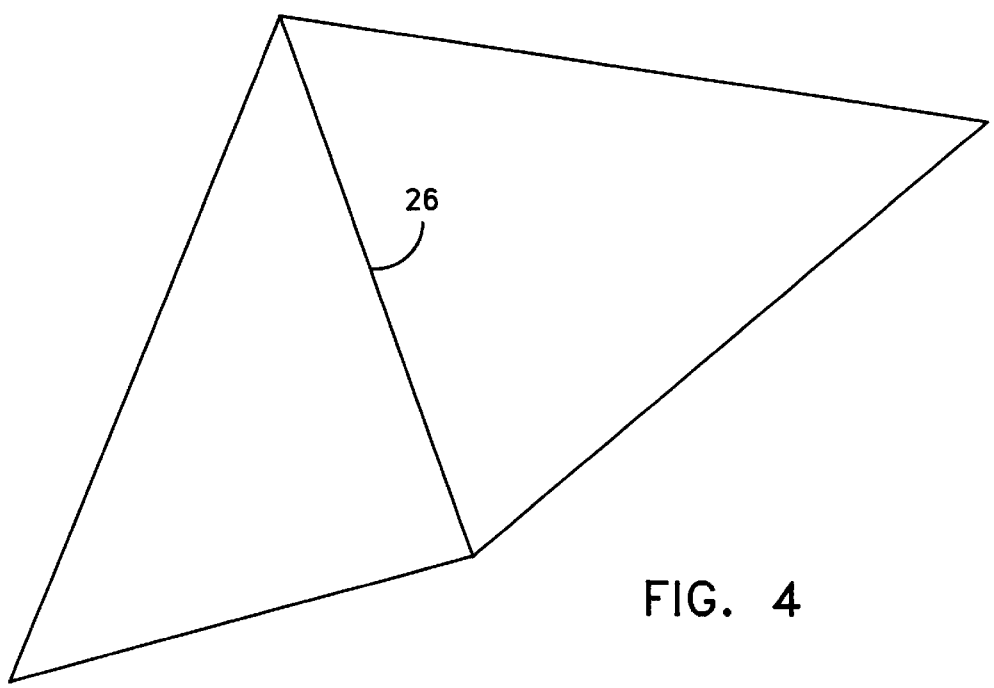
FIG. 4 is a diagram of two triangles having a shared edge.

Turning now to FIG. 4, a diagram of two triangles having a shared edge 26 is shown. Those of ordinary skill in the art will realize that consecutive triangles of an image often share a common edge. Conventionally, each of the two triangles would have all of their respective setup variables transmitted. It is possible however to derive certain of the setup variables for the second triangle from those of the first triangle. Which setup variables can be derived will depend on which edges are shared. There are nine possible matches.

A geometry compression method that will be referred to as edge sharing can be utilized by a system when two triangles have a shared edge. The method includes identifying when two triangles have a shared edge and utilizing four bits to indicate that such a condition exists and which edge is shared. In the event of a shared edge, two y coordinates, one x coordinate, and one edge slope of the second triangle can be derived from the corresponding setup variables for the shared edge of the first triangle. In this way, the corresponding five setup variables can be eliminated for the second triangle. Under edge sharing, hundreds of bits will be eliminated in exchange for four bits. For an image containing hundreds or thousands of shared edge primitives, the total savings would be substantial.

Also among the setup variables generated by geometry processing is a group of three values that specify the edge slopes of the triangle. However, the information conveyed by these edge slopes may be expressed with more precision than necessary in some applications. For example, when the integer portion of the absolute value of the slope is zero, several bits of integer precision are wasted.

A geometry compression method that will be referred to as slope coding can be utilized by a system when the precision of the edge slopes is not necessary. The method includes identifying when the absolute value of a slope is larger than a predetermined threshold such as two and transmitting the integer portion of the slope using full precision when such a condition exists. In either case, one bit is used to indicate which condition exists. In this way, one bit is added to the overhead for the edge slope in the case of a large slope and several bits can be eliminated for the case of a small slope. Under slope coding, as many as thirty-six bits may be eliminated in exchange for three bits. For an image containing hundreds or thousands of small edge slope primitives, the total savings would be substantial.

Also among the setup variables generated by geometry processing is a group of nine values that specify the three color start values and two slope values for each of the primary colors red (R), green (G), and blue (B). The slope values are added to the starting value to compute the color of each pixel falling inside the triangle. The slopes roughly specify the change in each color per horizontal and vertical pixel distance. However, these start and slope values may have a precision that is greater than necessary in some applications to prevent errors from accumulating to greater than one gray level in the rendered output. For example, these start and slope values are not necessary when the triangle is small in size, that is, many times smaller than the visible display area.

A geometry compression method that will be referred to as color quantization can be utilized by a system when these start and slope values are more precise than necessary. The method includes identifying when a triangle is substantially smaller than the visible display area and quantizing the start and slope setup variables to integer values such that the precision varies with the primitive size and guarantees a maximum error of a predetermined portion of a gray level throughout each rasterized primitive. For example, the gray level error may be chosen to be ¼, ⅛, ¹⁄₁₆, etc. In this way, the precision of the nine start and slope values can be tailored for the triangle in question. It should be noted that a ¼ gray level error may introduce distortion into the rendered output relative to the uncompressed rendered output. In practice, it was found that this error was sufficiently small so as to be imperceptible in the final output.

The key to tailoring the precision of the nine start and slope values for the triangle in question is to be able to determine the final error and the number of times the slopes are accumulated. This is strongly related to the size of the triangle. The rasterizers compute the color of any pixel according to the formula $$c = c_0 + N_e c_e + N_x c_x, \qquad (1)$$

where $c_0$ is the starting color value, $c_e$ is the color edge slope, $c_x$ is the color x scanline slope, and $N_e$ and $N_x$ are respectively the number of times that $c_e$ and $c_x$ are accumulated to obtain c. If the parameters $c_0$, $c_e$, and $c_x$ are approximated by $\hat{c}_0$, $\hat{c}_e$, and $\hat{c}_x$, then the error $\epsilon$ in the final color value can be given an upper bound by the formula $$\epsilon \leq \epsilon_0 + N_e \epsilon_e + N_x \epsilon_x, \qquad (2)$$

where $\epsilon_0 = |c_0 - \hat{c}_0|$, $\epsilon_e = |c_e - \hat{c}_e|$, and $\epsilon_x = |c_x - \hat{c}_x|$ are the errors in the approximation of the parameters. If $R_0$, $R_e$, and $R_x$ are the fractional bits used to approximate $c_0$, $c_e$, and $c_x$, respectively, then the final error is guaranteed to be smaller than $\epsilon$ if $$\epsilon \geq 2^{-(R_0+1)} + N_e 2^{-(R_e+1)} + N_x 2^{-(R_x+1)} \qquad (3)$$

It can be shown that the minimum of $R_0 + R_e + R_x$ subject to the constraint of EQ. (3) is achieved by making $$R_0 = -\log_2(\epsilon/3) - 1, \qquad (4)$$

$$R_e = -\log_2(\epsilon/3N_e) - 1, \qquad (5)$$

and $$R_x = -\log_2(\epsilon/3N_x) - 1. \qquad (6)$$

For simplification, $R_e$ can be set equal to $R_x$. As a result, the fractional bits become $$R_0 = -\log_2(\epsilon/2) - 1, \qquad (7)$$

$$R_e = R_x = -\log_2(\epsilon/(2(N_e + N_x))) - 1. \qquad (8)$$

The error $\epsilon$ can be selected to have a value of ¼, ⅛, ¹⁄₁₆, ¹⁄₃₂, etc. Acceptable results were obtained using the value of ¼.

Figure 5:
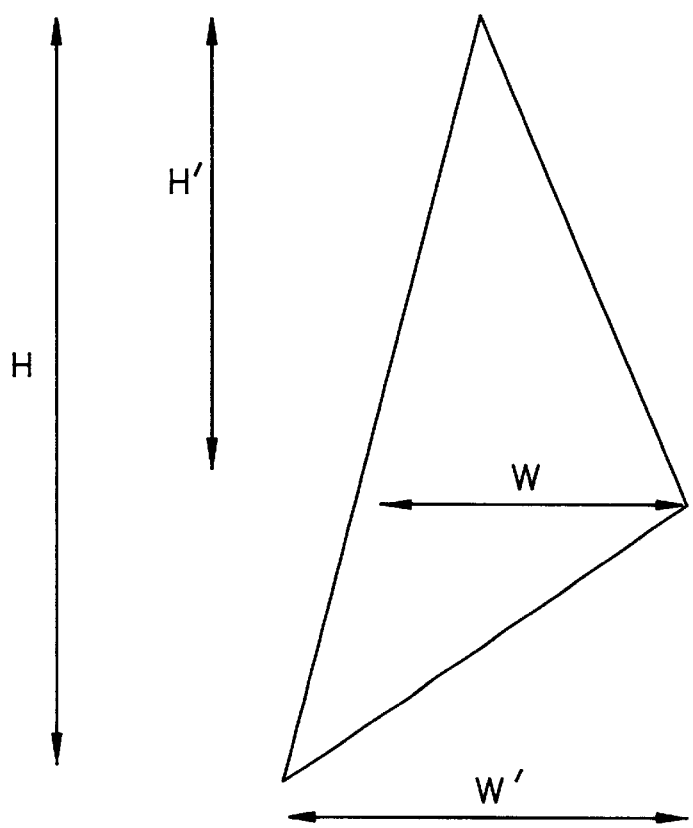
FIG. 5 is a diagram illustrating four reference heights and widths of a triangle.

Turning now to FIG. 5, a diagram illustrating four reference heights and widths of a triangle is shown. Each length is measured in pixel center distances. The length H is the absolute height of the triangle. The length H' is the height of the triangle from its widest point. The length W is the width of the triangle at its widest point. The length W' is the absolute width of the triangle. Using these four lengths, two bounds on the sum of $N_e + N_x$ can be determined. A first bound is given by the formula $$N_e + N_x \leq \max(2H, 2H' + W). \qquad (9)$$

A second simpler but weaker bound is given by the formula $$N_e + N_x \leq (2H + W'). \qquad (10)$$

Figure 6:
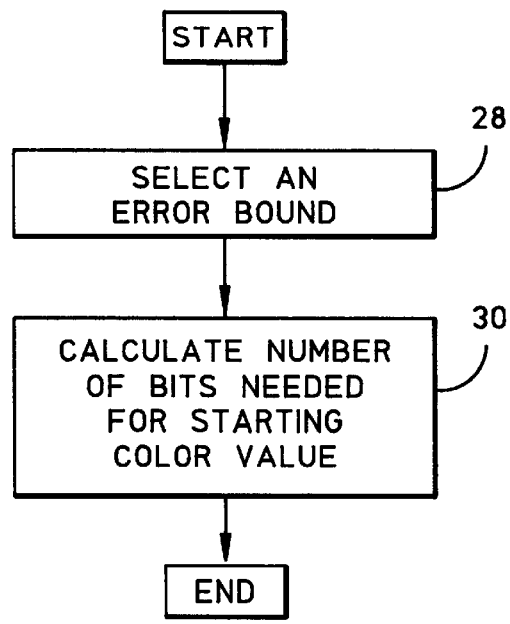
FIG. 6 is a flow diagram of setup for a color quantization graphics compression method according to one embodiment of the present invention.

Turning now to FIG. 6, a flow diagram of setup for a color quantization graphics compression method according to one embodiment of the present invention shown. The setup is preferably done one time as a preprocess at the time of the implementation of the hardware or firmware. The process begins at START. At block 28, the process selects an error bound $\epsilon$ for the compression. At block 30, the process calculates the number of bits needed for the starting color value (see EQ. 7). These preselected and precalculated values will impact the method of FIG. 7 which is described next.

Figure 7:
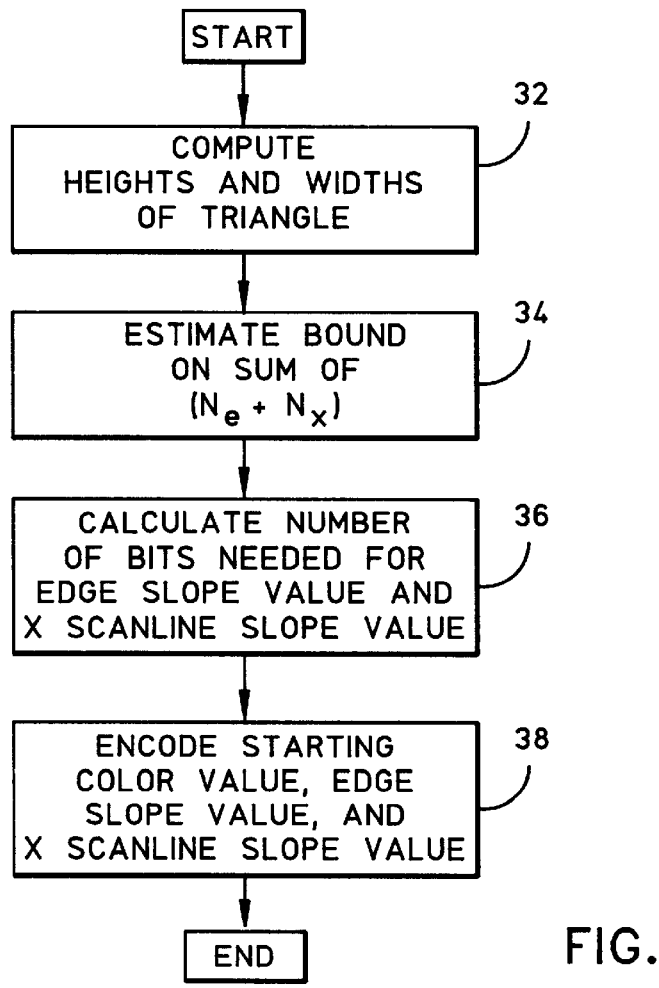
FIG. 7 is a flow diagram of a color quantization graphics compression method according to one embodiment of the present invention.

Turning now to FIG. 7, a flow diagram of a color quantization graphics compression method according to one embodiment of the present invention is shown. The process begins at START for each triangle and returns to this point until there are no more triangles. The same precision may be used for all attributes of the same start precision, such as red, green, blue, and alpha. At block 32, the process computes the heights and widths of the triangle. Recall from FIG. 5 above that these include the absolute height of the triangle, the height of the triangle from its widest point, the width of the triangle at its widest point, and the absolute width of the triangle. However, depending on the bound used in the next block of the process, all four of these may not be needed. At block 34, the process estimates the bound on the sum of $N_e+N_x$ (see EQ. 9 or 10). At block 36, the process calculates the number of bits needed for the edge slope value and the x scanline slope value (see EQ. 8). Finally, at block 38, the process encodes the starting color value, the edge slope value, and the x scanline slope value using the calculated number of bits. Under color quantization, unnecessary precision bits can be eliminated. More bits are typically used for z and fewer bits for color. Possible candidate setup variables for color quantization include color (red, green, and blue), opacity (alpha), depth (z), texture variables, and normals. For an image containing hundreds or thousands of small primitives, the total savings would be substantial.

The specific examples of geometry compression disclosed above included full packing, constant color, delta coding, edge sharing, slope coding, and color quantization. Taken individually, each represents a substantial savings. It should also be noted that the techniques can be combined for even greater savings overall. Taken in combination, compression ratios as high as two to one have been achieved in practice. This represents far more efficient utilization of the special purpose memories and hardware of the graphics system.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A method of graphics compression of a graphics pipeline of a computer, the graphics pipeline having geometry processing and rasterization, the method being performed as part of the graphics pipeline at least partially in or between geometry processing and rasterization, the method comprising the steps of:

identifying when all six of the slope values have a zero value for a set of setup variables;

modifying the set of setup variables by eliminating the six slope values from the set; and indicating that the set of setup variables has been modified.

2. An apparatus for graphics compression of a graphics pipeline of a computer, the graphics pipeline having geometry processing and rasterization, the apparatus being located in the graphics pipeline at least partially in or between geometry processing and rasterization, the apparatus comprising:

means for identifying when all six of the slope values have a zero value for a set of setup variables;

means for modifying the set of setup variables by eliminating the six slope values from the set; and means for indicating that the set of setup variables has been modified.

3. The apparatus according to claim 2 wherein the means for indicating comprises one bit that changes state when the set of geometry information has been modified.

4. A method of graphics compression of a graphics pipeline of a computer, the graphics pipeline having geometry processing and rasterization, the method being performed as part of the graphics pipeline at least partially in or between geometry processing and rasterization, the method comprising the steps of:

selecting an anchor coordinate value in each of the x and y directions from a set of setup variables;

calculating the differences between the anchor coordinate and the other two coordinates in each of the x and y directions;

encoding the differences; and modifying the set of setup variables by substituting the encoded differences for the non-anchor coordinate values.

5. The method according to claim 4 wherein the step for encoding the differences comprises a Golomb coding technique.

6. An apparatus for graphics compression of a graphics pipeline of a computer, the graphics pipeline having geometry processing and rasterization, the apparatus being located in the graphics pipeline at least partially in or between geometry processing and rasterization, the apparatus comprising:

means for selecting an anchor coordinate value in each of the x and y directions from a set of setup variables;

means for calculating the differences between the anchor coordinate and the other two coordinates in each of the x and y directions;

means for encoding the differences; and means for modifying the set of setup variables by substituting the encoded differences for the non-anchor coordinate values.

7. The apparatus according to claim 6 wherein the means for encoding comprises a Golomb coding technique.

8. A method of graphics compression of a graphics pipeline of a computer, the graphics pipeline having geometry processing and rasterization, the method being performed as part of the graphics pipeline at least partially in or between geometry processing and rasterization, the method comprising the steps of:

identifying when a first triangle and a second triangle of an image have a shared edge;

modifying a set of setup variables for the second triangle by eliminating the setup variables that can be derived from a set of setup variables for the first triangle based on the shared edge; and indicating that the set of setup variables for the second triangle have been modified.

9. An apparatus for graphics compression of a graphics pipeline of a computer, the graphics pipeline having geometry processing and rasterization, the apparatus being located in the graphics pipeline at least partially in or between geometry processing and rasterization, the apparatus comprising:

means for identifying when a first triangle and a second triangle of an image have a shared edge;

means for modifying a set of setup variables for the second triangle by eliminating the setup variables that can be derived from a set of setup variables for the first triangle based on the shared edge; and means for indicating that the set of setup variables for the second triangle have been modified.

10. The apparatus according to claim 9 wherein the means for indicating comprises four bits that change state when the set of setup variables have been modified and identify which edge is shared.

11. A method of graphics compression of a graphics pipeline of a computer, the graphics pipeline having geometry processing and rasterization, the method being performed as part of the graphics pipeline at least partially in or between geometry processing and rasterization, the method comprising the steps of:

identifying when an absolute value of an edge slope value of a set of setup variables is greater than a predetermined threshold;

modifying the edge slope value by adjusting the integer portion when the absolute value is less than the predetermined threshold; and indicating whether the set of setup variables has been modified.

12. An apparatus for graphics compression of a graphics pipeline of a computer, the graphics pipeline having geometry processing and rasterization, the apparatus being located in the graphics pipeline at least partially in or between geometry processing and rasterization, the apparatus comprising:

means for identifying when an absolute value of an edge slope value of a set of setup variables is greater than a predetermined threshold;

means for modifying the edge slope value by adjusting the integer portion when the absolute value is less than the predetermined threshold; and means for indicating whether the set of setup variables has been modified.

13. The apparatus according to claim 12, wherein the means for indicating comprises one bit that alternates between a first state when the set of geometry information has been modified and a second state when the set of geometry information has not been modified.

14. A method of graphics compression of a graphics pipeline of a computer, the graphics pipeline having geometry processing and rasterization, the method being performed as part of the graphics pipeline at least partially in or between geometry processing and rasterization, the method having a preselected error bound $\epsilon$ and a precalculated number of bits needed for a starting color value, the method comprising the steps of:

computing at least one height and at least one width of a triangle in question;

estimating a bound on the sum of $N_e+N_x$;

calculating a number of bits needed for an edge slope value and an x scanline slope value; and encoding the starting color value, the edge slope value, and the x scanline slope value using the calculated number of bits.

15. An apparatus for graphics compression of a graphics pipeline of a computer, the graphics pipeline having geometry processing and rasterization, the apparatus being located in the graphics pipeline at least partially in or between geometry processing and rasterization, the apparatus having a preselected error bound $\epsilon$ and a precalculated number of bits needed for a starting color value, the apparatus comprising:

means for computing at least one height and at least one width of a triangle in question;

means for estimating a bound on the sum of $N_e+N_x$;

means for calculating a number of bits needed for an edge slope value and an x scanline slope value; and means for encoding the starting color value, the edge slope value, and the x scanline slope value using the calculated number of bits.

* * * * *